United States Patent Office 3,450,522
Patented June 17, 1969

3,450,522
HERBICIDAL ETHER
Delores V. Lopiekes, Bridgewater, Mass., assignor to Monsanto Research Corporation, St. Louis, Mo., a corporation of Delaware
No Drawing. Original application Aug. 19, 1965, Ser. No. 481,099, now Patent No. 3,388,171, dated June 11, 1968. Divided and this application Jan. 30, 1968, Ser. No. 719,280
Int. Cl. A01n 9/24, 7/00
U.S. Cl. 71—124                             6 Claims

ABSTRACT OF THE DISCLOSURE

A method for controlling the growth of plants employing an alkoxyarylethyl aryl ether as the phytotoxicant.

---

This is a division of application Ser. No. 481,099 filed Aug. 19, 1965, now Patent No. 3,388,171.

This invention relates to alkoxyarylalkyl aryl ethers, and more particularly, to products of the reaction of arylmagnesium halides with acetals; to methods of producing the same; and to compositions and methods for the application of the said ethers as herbicides and insecticides.

According to the invention, there are prepared new and useful compounds which are the products of the reaction of arylmagnesium halides with aryloxyacetaldehyde dialkyl acetals according to the scheme:

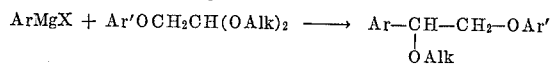

in which Alk is a saturated aliphatic hydrocarbon chain, straight or branched, of from 1 to 6 carbon atoms, X is a halogen of atomic weight from 35 to 127, Ar is an aromatic ring system consisting of from 6 to 12 carbons, and H atoms, and Ar' is an aromatic ring system consisting of from 6 to 12 carbons, and H atoms. Ar and Ar' include aralkyl and alkaryl groups.

The arylmagnesium halides are known compounds. Examples of some useful aryl magnesium halides are:

m-tolylmagnesium chloride,
2,3-dimethylphenylmagnesium bromide,
2,4-dimethylphenylmagnesium iodide,
3,5-dimethylphenylmagnesium chloride,
2,3,4-trimethylphenylmagnesium bromide,
2,3,5-trimethylphenylmagnesium iodide,
2,4,5-trimethylphenylmagnesium chloride,
2,3,6-trimethylphenylmagnesium bromide,
o-tolylmagnesium iodide,
p-tolylmagnesium chloride,
o-ethylphenylmagnesium bromide,
m-ethylphenylmagnesium iodide,
p-ethylphenylmagnesium chloride,
2,3-diethylphenylmagnesium bromide,
3,5-diethylphenylmagnesium iodide,
2,3,4,-triethylphenylmagnesium chloride,
2,4,5-triethylphenylmagnesium bromide,
o-propylphenylmagnesium iodide,
m-propylphenylmagnesium chloride,
p-propylphenylmagnesium bromide,
2,4-dipropylphenylmagnesium iodide,
o-isopropylphenylmagnesium chloride,
2,3-diisopropylphenylmagnesium bromide,
o-butylphenylmagnesium iodide,
m-butylphenylmagnesium chloride,
p-butylphenylmagnesium bromide,
m-isobutylphenylmagnesium iodide,
p-sec-butylphenylmagnesium chloride,
o-tert-butylphenylmagnesium bromide,
o-pentylphenylmagnesium iodide,
m-tert-pentylphenylmagnesium chloride,
p-tert-pentylphenylmagnesium bromide,
o-isopentylphenylmagnesium iodide,
m-hexylphenylmagnesium chloride,
p-isohexylphenylmagnesium bromide,
o-(1-methylbutyl)phenylmagnesium iodide,
m-(2-methylbutyl)phenylmagnesium chloride,
p-(2,2-dimethylpropyl)phenylmagnesium bromide,
o-(1-ethylpropyl)phenylmagnesium iodide,
m-(3-ethylpropyl)phenylmagnesium chloride,
p-(1-methylpentyl)phenylmagnesium bromide,
o-(2-methylpentyl)phenylmagnesium iodide,
m-(3-methylpentyl)phenylmagnesium chloride,
p-(1,1-dimethylbutyl)phenylmagnesium bromide,
o-(2,2-dimethylbutyl)phenylmagnesium iodide,
m-(3,3-dimethylbutyl)phenylmagnesium chloride,
p-(1,2-dimethylbutyl)phenylmagnesium bromide,
o-(1,3-dimethylbutyl)phenylmagnesium iodide,
m-(1-methylpentyl)phenylmagnesium chloride,
p-(2,3-dimethylbutyl)phenylmagnesium bromide,
o-(2,3-dimethylbutyl)phenylmagnesium iodide,
m-(1-ethylbutyl)phenylmagnesium chloride,
p-(2-ethylbutyl)phenylmagnesium chloride,
o-(3-methylpentyl)phenylmagnesium chloride,
3-ethyl-4-propylphenylmagnesium chloride,
2-butyl-6-ethylphenylmagnesium bromide,
2-ethyl-5-isopropylphenylmagnesium iodide,
2-ethyl-3-(1-methylbutyl)phenylmagnesium chloride,
p-biphenylylmagnesium chloride,
o-biphenylylmagnesium bromide,
m-biphenylylmagnesium iodide,
naphthylmagnesium chloride,
naphthylmagnesium bromide,
naphthylmagnesium iodide.

An example of useful aryloxyacetaldehyde dialkyl acetals may be mentioned:

o-toluoxyacetaldehyde dimethyl acetal,
2,3-dimethylphenoxyacetaldehyde diethyl acetal,
2,4-dimethylphenoxyacetaldehyde dipropyl acetal,
3,5-dimethylphenoxyacetaldehyde dibutyl acetal,
2,3,4-trimethylphenoxyacetaldehyde dipentyl acetal,
2,3,5-trimethylphenoxyacetaldehyde dihexyl acetal,
2,4,5-trimethylphenoxyacetaldehyde dimethyl acetal,
2,3,6-trimethylphenoxyacetaldehyde diethyl acetal,
m-tolyoxyacetaldehyde dipropyl acetal,
p-tolyoxyacetaldehyde dibutyl acetal,
o-ethylphenoxyacetaldehyde dipentyl acetal,
m-ethylphenoxyacetaldehyde dihexyl acetal,
p-ethylphenoxyacetaldehyde diisobutyl acetal,
2,3-diethylphenoxyacetaldehyde diisohexyl acetal,
3,5-diethylphenoxyacetaldehyde diisopentyl acetal,
2,3,4-triethylphenoxyacetaldehyde diisopropyl acetal,
2,4,5-triethylphenoxyacetaldehyde di-sec-butyl acetal,
o-propylphenoxyacetaldehyde di-tert-butyl acetal,
m-propylphenoxyacetaldehyde bis(1-methylbutyl) acetal,
p-propylphenoxyacetaldehyde bis(2-methylbutyl) acetal,
2,2-dipropylphenoxyacetaldehyde bis(2,2-dimethylpropyl) acetal,
o-isopropylphenoxyacetaldehyde bis(1-ethylpropyl) acetal,
2,3-dipropylphenoxyacetaldehyde bis(2-methylbutyl) acetal,
o-butylphenoxyacetaldehyde bis(1-methylpentyl) acetal,
m-butylphenoxyacetaldehyde bis(2-methylpentyl) acetal,
p-butylphenoxyacetaldehyde bis(3-methylpentyl) acetal,
m-isobutylphenoxyacetaldehyde bis(1,1-dimethylpentyl) acetal,
p-sec-butylphenoxyacetaldehyde bis(2,2-dimethylpentyl) acetal, o-tert-butylphenoxyacetaldehyde bis(3,3-dimethylbutyl) acetal,
o-pentylphenoxyacetaldehyde bis(1,2-dimethylbutyl) acetal,
m-tert-pentylphenoxyacetaldehyde bis(1,3-dimethylbutyl) acetal,
p-tert-pentylphenoxyacetaldehyde bis(1-methylpentyl) acetal,
o-isopentylphenoxyacetaldehyde bis(2,3-dimethylbutyl) acetal,
m-hexylphenoxyacetaldehyde bis(2-methylpentyl) acetal,
p-isohexylphenoxyacetaldehyde bis(1-ethylbutyl) acetal,
o-isohexylphenoxyacetaldehyde bis(2-ethylbutyl) acetal,
o-(1-methylbutyl)phenoxyacetaldehyde bis(3-methylpentyl) acetal,
m-(2-methylbutylphenoxyacetaldehyde) bis(3,3-dimethylbutyl) acetal,
p-(2,2-dimethylpropylphenoxy)acetaldehyde bis(2,2-dimethylbutyl) acetal,
o-(1-ethylpropyl)phenoxyacetaldehyde bis(1,2-dimethylbutyl) acetal,
m-(2-methylbutyl)phenoxyacetaldehyde bis(3-methylpentyl) acetal,
p-(2-methylbutyl)phenoxyacetaldehyde bis(2-methylpentyl) acetal,
o-(1-methylpentyl)phenoxyacetaldehyde bis(1-methylpentyl) acetal,
m-(2-methylpentyl)phenoxyacetaldehyde bis(2-methylbutyl) acetal,
p-(3-methylpentyl)phenoxyacetaldehyde bis(1-ethylpropyl) acetal,
o-(1,1-dimethylbutyl)phenoxyacetaldehyde bis(2,2-dimethylpropyl) acetal,
m-(2,2-dimethylbutyl)phenoxyacetaldehyde bis(2-methylbutyl acetal,
p-(3,3-dimethylbutyl)phenoxyacetaldehyde dimethyl acetal,
m-(1,3-dimethylbutyl)phenoxyacetaldehyde diethyl acetal,
o-(1,3-dimethylbutyl)phenoxyacetaldehyde dipropyl acetal,
p-(1-methylpentyl)phenoxyacetaldehyde dibutyl acetal,
m-(2,3-dimethylbutyl)phenoxyacetaldehyde dipentyl acetal,
o-(2-methylpentyl)phenoxyacetaldehyde dihexyl acetal,
m-(1-ethylbutyl)phenoxyactaldehyde dimethyl acetal,
p-(2-ethylbutyl)phenoxyacetaldehyde diethyl acetal,
o-(2-methylpentyl)phenoxyacetaldehyde dipropyl acetal,
3-methyl-4-propylphenoxyacetaldehyde dibutyl acetal,
2-ethyl-6-butylphenoxyacetaldehyde dipentyl acetal,
2-ethyl-5-isopropylphenoxyacetaldehyde diisobutyl acetal,
2-methyl-3-(1-methylbutyl)phenoxyacetaldehyde bis(2,2-dimethylpropyl) acetal,
p-phenylphenoxyacetaldehyde dimethyl acetal,
o-phenylphenoxyacetaldehyde diisopentyl acetal,
m-phenylphenoxyacetaldehyde di-sec-butyl acetal,
naphthloxyphenoxyacetaldehyde diethyl acetal,
naphthloxyphenoxyacetaldehyde bis(1-ethylpentyl) acetal,
naphthloxyphenoxyacetaldehyde bis(2-methylpentyl) acetal.

The products of the reaction of arylmagnesium halides with aryloxyacetaldehyde dialkyl acetals are the corresponding ethers of the formula:

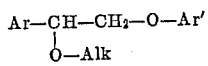

wherein Ar, Ar', and Alk are the same as stated above.
Examples of these ethers include:
β-ethoxyphenethyl phenyl ether,
β-methoxyphenethyl phenyl ether,
β-propoxyphenethyl phenyl ether,
β-butoxyphenethyl phenyl ether,
β-hexoxyphenethyl phenyl ether,
β-methoxy-o-methylphenethyl 3-(1-methylbutyl)o-tolyl ether,
β-propoxy-2,4-dimethylphenethyl 2-ethyl-5-isopropylphenyl ether,
β-pentoxy-2,4,5-trimethylphenethyl 3-ethyl-4-propylphenyl ether,
β-hexoxy-m-methylphenylethyl o-(3-methylpentyl)phenyl ether,
β-ethoxy-p-methylphenethyl m-(1-ethylbutyl)phenyl ether,
β-propoxy-3,5-diethylphenethyl o-(2-methylpentyl) phenyl ether,
β-pentoxy-m-propylphenethyl m-(1-methylpentyl) phenyl ether,
β-hexoxy-2,2-dipropylphenethyl o-(1,3-dimethylbutyl) phenyl ether,
β-isohexoxy-m-butylphenethyl m-(3,3-dimethylbutyl) phenyl ether,
β-isopentoxy-m-isobutylphenethyl o-(2,2-dimethylbutyl) phenyl ether,
β-isobutoxy-m-tert-pentylphenethyl m-(3-methylpentyl) phenyl ether,
β-tert-butoxy-o-isopentylphenethyl o-(2-methylpentyl) phenyl ether,
β-(1-methylbutoxy)-p-isohexylphenethyl p-(1-methylpentyl)phenyl ether,
β-(2-methylbutoxy)-m-(2-methylbutyl)phenethyl m-(2-methylbutyl)phenyl ether,
β-(1-ethylpropoxy)-p-(1-methylpentyl)phenethyl p-(2,2-dimethylpropyl)phenyl ether,
β-(2-methylbutoxy)-m-(3-methylpentyl)phenethyl m-(2-methylbutyl)phenyl ether,
β-pentoxy-p-(1,1-dipentyl)phenethyl 2,3,4-trimethyl) phenyl ether,
β-(2,2-dimethylbutoxy)-o-(2-methylpentyl)phenethyl o-tolyl ether,
β-(1-methylpentoxy)-p-(2,2-dimethylpropyl)phenethyl 2,3,4-trimethylphenyl ether,
β-(2-methylpentoxy)-o-(1-methylbutyl)phenethyl o-ethylphenyl ether,
β-(2,2-dimethylbutoxy)-p-tert-pentylphenethyl 2,3,4-triethylphenyl ether,
β-(3,3-dimethylbutoxy)-o-tert-butylphenethyl m-propylphenyl ether,
β-(2,2-dimethylbutoxy)-m-butylphenethyl p-isopropylphenyl ether,
β-(1,1-dimethylbutoxy)-2,3-diisopropylphenethyl m-butylphenyl ether,
β-(2,2-dimethylbutoxy)-m-propylphenethyl o-sec-phenyl ether,
β-(1,1-dimethylbutoxy)-2,4,5-triethylphenethyl m-tert-phenyl ether,
β-(1,1-dimethylbutoxy)-p-ethylphenethyl o-tert-pentylphenyl ether,
β-(2,2-dimethylpropoxy)-2,3,6-trimethylphenethyl m-hexylphenyl ether,
β-(ethoxy-o-biphenylyl)ethyl naphthyl ether,
β-(isohexoxynaphthyl)ethyl naphthyl ether,
β-(1-methylbutoxy-m-biphenylyl)ethyl naphthyl ether,
β-(3-methylpentoxy-naphthyl)ethyl o-biphenylyl ether,
β-(3,3-dimethoxy-p-biphenylyl)ethyl m-biphenyl ether,
β-(2-ethylpropoxy-naphthyl)ethyl p-biphenylyl ether.

In preparing the present compounds, the arylmagnesium halide is contacted with the acetal. As illustrated by the above equation, equimolar quantities of the two reactants may be employed in forming the desired ether; however, for best results a greater amount of the arylmagnesium halide may be employed, although an excess of the more readily available component may be utilized, if desired. The relative proportions of components may be varied, for example, from one mole of arylmagnesium halide and two moles of acetal to ten moles of arylmagnesium halide and one mole of acetal. Excess reactant can then be removed at the end of the reaction by extraction, distillation, etc. The solvent in which the reaction is run may be any inert organic solvent including for example, a hydrocarbon, such as dl-pinene; an aromatic compound such as toluene, p-xylene, o-xylene, or cumene; an ether such as isobutyl ether, methyl Cellosolve, Cellosolve, or anisol; an alicyclic compound such as cycloheptane; and a ketone such as cyclohexanone.

The reaction generally does not proceed rapidly at room temperature, and heating may be employed to accelerate the formation of the ether product. Suitable temperatures range from just above the freezing point of the reactants to just below the decomposition temperatures of the reactants and products: for example, temperatures in the range of 0° to 250° C. are usually suitable. Generally, the reaction is conducted advantageously at atmospheric pressure, although sub- or superatmospheric pressures may be employed if desired, for example, to raise or lower the reaction temperature. The method may be adapted to either a batch or a continuous process.

After the reactants are contacted, a substance such as water, dilute acid, aqueous ammonium chloride or the like may advantageously be added to the reaction mixture to hydrolyze excess arylmagnesium halide.

The isolation of the product may be accomplished by any general standard procedures, such as distillation, extraction, and crystallization.

The alkoxyarylalkyl aryl ethers are useful for a variety of chemical and agricultural purposes. They are useful as biological toxicants and they are particularly valuable as herbicides and are also active as insecticides.

The invention is further illustrated, but not limited by the following examples.

EXAMPLE 1

This example illustrates the preparation of a compound as provided by this invention.

63 grams (g.) of phenoxyacetaldehyde diethyl acetal in 300 milliliters (ml.) of xylene is added dropwise, over a period of thirty minutes, to 200 ml. of 3 M phenylmagnesium bromide and 200 ml. of xylene. When the addition of the acetal is complete, the reaction mixture is heated to 135° C. and the ether is distilled off. The reaction mixture is heated for four hours. 40 g. of ammonium chloride in aqueous solution is added to hydrolyze excess phenylmagnesium bromide. The solvent is evaporated and the residue is filtered to separate the precipitated magnesium salts from the desired product.

The product, β-ethoxyphenethyl phenyl ether, is obtained as a pale yellow liquid, B.P. 106° C./0.04 mm., $n_D{}^{25}$ 1.5457. Its structure is confirmed by its infrared spectrum and elemental analysis.

Analysis.—Calcd. for $C_{16}H_{18}O_2$ (percent): C, 79.3; H, 7.5. Found: C, 79.5; H, 7.6.

EXAMPLE 2

This example illustrates the preparation of another compound as provided by this invention.

70 g. of naphthyloxyacetaldehyde bis(1-methylbutyl) acetal in 300 ml. of xylene is added dropwise, over a period of thirty minutes, to 200 ml. of 5 M 3-ethyl-2-isopropylphenylmagnesium iodide and 200 ml. of xylene. When the addition of the acetal is complete, the reaction mixture is heated to 135° C. and the ether is distilled off. The reaction mixture is heated for four hours. 54 g. of ammonium chloride in aqueous solution is added to hydrolyze excess 3 - ethyl - 2 - isopropylphenylmagnesium iodide. The solvent is evaporated and the residue is filtered to separate the precipitated magnesium salts from the β-(1-methylbutoxy)naphthylethyl 3-ethyl-2-isopropylphenyl ether.

The compounds of this invention may be used as biological toxicants. In order to use them effectively on plants or insects it is often desirable to mix them with an inert carrier, as only a small dose of the compounds of this invention is needed for effective toxicant action. The carrier may be such substances as inert diluents, dusts and oils. It is often desirable to use a dispersing agent such as a surfactant to get the compounds of the invention into the carrier in such varied forms as solutions, suspensions, or mixtures.

This invention is not limited in its broad aspects to any particular dispersing agent, or combination of such agents. Nor is the invention in its broad aspects limited to agents of either the ionic type, such as alkylbenzenesulfonates or sodium laurate, or the non-ionic type, such as sulphonated castor oil, peanut oil, soy oil, soaps—for instance—sodium laurate, polyglycol monoethers with long chain fatty alcohols and excess ethylene oxide, although, in general, the non-ionic type is more effective.

The use of the compounds of the present invention as biological toxicants is further illustrated by the following examples.

EXAMPLE 3

This example illustrates the utilization of a compound as provided by this invention.

An aluminum pan flat filled with top soil which had been screened through ¼" wire mesh is randomly seeded with seeds of morning glory, rye grass, foxtail, crabgrass, pigweed, soybean and tomato. The seeds are then covered with an excess of soil which is pressed and leveled. 0.6 g. of β-ethoxyphenethyl phenyl ether is combined with 30 ml. of acetone. 4.1 ml. of this stock solution is pipetted into an atomizer vial and diluted with water to 15 ml. 4.12 ml. of this stock solution is sprayed on the standard 9½" x 5¾" soil surface area of the test pan, which is equivalent to application of the chemical at the rate of 25 lbs. per acre. Two weeks after application of the β-ethoxyphenethyl phenyl ether, the results are observed and recorded. All, or substantially all, of the grass species, the wild oat, rye grass, foxtail, crabgrass, and pigweed have not emerged, while all, or substantially all of the broadleaf species, the morning glory, soybean and tomato seedlings have emerged and the β-ethoxyphenethyl phenyl ether has no perceptible phytotoxic effect in the maturation of the young plants. The high selectivity between broadleaf and grass species of the herbicidal effects of the present compound is evident from the above data.

EXAMPLE 4

In insecticidal screening, activity for control of mosquito larvae is demonstrated as follows.

β-Ethoxyphenethyl phenyl ether is mixed with 50 ml. of water and 0.5 ml. of acetone to provide 10 p.p.m. concentrations of the ether in liquid. Some 20 early fourth instar yellow fever mosquito larvae (Aedes aegypti) are placed in the containers holding the solutions of the ether compounds and held there at room temperature for 24 hours. The ether produces a 30 percent mortality of the larvae.

When 0.1 ml. of a mixture of 3 standard insecticides (of the chlorinated hydrocarbon, carbamate, and organic phosphorus type, respectively) in acetone, which in itself would produce about a 5% mortality rate in the larvae, is now added to the partially killed larvae in the solution, 70% mortality has occurred within another 24 hours, thus demonstrating synergistic activity of the present novel ether.

While the invention has been described with particular reference to various preferred embodiments thereof, other variations in the constituent compounds, the methods of preparing same, the compositions, and uses of this invention may be readily made by those skilled in the art and it will be appreciated that numerous modifications and variations are possible without departure from the spirit and scope of the invention. Therefore, the invention is not intended to be limited except as indicated in the appended claims.

What is claimed is:

1. A method for controlling the growth of vegetation which consists in applying to the environment of the vegetation a toxic amount of a composition containing an active ingredient of the formula

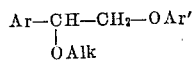

in which Alk is a saturated aliphatic hydrocarbon chain, straight or branched, of from 1 to 6 carbon atoms, and each of Ar and Ar' is an aromatic, hydrocarbon radical of 6 to 12 carbon atoms.

2. The method of claim 1 in which said composition contains an inert carrier.

3. The method of claim 1 in which said composition contains an inert carrier and a dispersing agent.

4. A method of controlling vegetative growth which consists in applying to soil containing plant seeds the composition of claim 1.

5. A method of controlling vegetative growth which consists in applying to the soil containing plant seeds a composition containing 2-ethoxyphenethyl phenyl ether and an inert carrier.

6. A method for selectively suppressing the growth of grass by applying to soil containing seeds of both grass and broadleaf species the composition of claim 1.

References Cited

UNITED STATES PATENTS 2,287,249   6/1942   Holt.
2,553,555   5/1951   Drake.

LEWIS GOTTS, *Primary Examiner.*

C. L. MILLS, *Assistant Examiner.*

U.S. Cl. X.R.

424—341